United States Patent
Jiang et al.

(10) Patent No.: US 7,729,612 B2
(45) Date of Patent: Jun. 1, 2010

(54) METHOD AND SYSTEM FOR MAINTENANCE OF A PASSIVE OPTICAL NETWORK

(75) Inventors: Tao Jiang, Shenzhen (CN); Yuntao Wang, Shenzhen (CN); Jun Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 706 days.

(21) Appl. No.: 11/609,251

(22) Filed: Dec. 11, 2006

(65) Prior Publication Data

US 2007/0230958 A1    Oct. 4, 2007

(30) Foreign Application Priority Data

Apr. 2, 2006    (CN) .................. 2006 1 0034854

(51) Int. Cl.
*H04B 10/08* (2006.01)
*H04B 17/00* (2006.01)
(52) U.S. Cl. ................... 398/10; 398/15; 398/17; 398/38

(58) Field of Classification Search ............... 398/15, 398/9, 10, 38, 17
See application file for complete search history.

(56) References Cited

U.S. PATENT DOCUMENTS

| | | | |
|---|---|---|---|
| 2002/0101631 A1* | 8/2002 | Gerstel et al. | 359/110 |
| 2003/0177216 A1* | 9/2003 | Sutherland et al. | 709/223 |
| 2006/0093356 A1* | 5/2006 | Vereen et al. | 398/33 |
| 2006/0268759 A1* | 11/2006 | Emery et al. | 370/321 |
| 2007/0237520 A1* | 10/2007 | DeLew et al. | 398/17 |

* cited by examiner

*Primary Examiner*—Ken N Vanderpuye
*Assistant Examiner*—Oommen Jacob
(74) *Attorney, Agent, or Firm*—Conley Rose, P.C.; Grant Rudolph

(57) ABSTRACT

The present disclosure relates to a passive optical network (PON) and discloses a method and system for maintaining the PON where the optical line terminal (OLT) is provided with an optical power detection module for measuring the total power of optical signals received by the PON, and the optical network units (ONUs) are provided with an optical transmitter power supply module.

7 Claims, 4 Drawing Sheets

METHOD AND SYSTEM FOR MAINTENANCE OF A PASSIVE OPTICAL NETWORK

CROSS-REFERENCE TO RELATED APPLICATIONS

This application is claiming priority of Chinese Application No. 200610034854.7 filed Apr. 2, 2006, entitled "Method and System for Maintenance of a Passive Optical Network," which application is incorporated by reference herein in its entirety.

BACKGROUND

The present disclosure generally relates to Passive Optical Network (PON) technology, and more particularly to a maintenance method and system for passive optical networks.

In broadband access networks, which are growing in scale, most existing local access networks (LANs) run at 100 Megabits per second (Mbps) and many large commercial companies are transitioning to Gigabit Ethernet (GE). However, in the metropolitan area core networks and the edge networks, the bandwidth capacity of synchronous optical network (SONET), synchronous digital hierarchy (SDH), and GE is abundant, which results in a bandwidth bottleneck at the access network. Compared to cable transmissions, optical fiber transmissions have many advantages, such as a large capacity, limited loss, and a strong ability to resist electromagnetic interference. Thus, with the cost of optical fiber transmission decreasing, the tendency is towards using fiber in the access network. The last mile access networks require low cost, simple structure, and ease of realization, which is a challenge to achieve technologically. Through the use of passive devices, PONs are a potential technology for broadband optical access networks.

As one of the potential technologies for broadband access networks, there are many technical advantages to PONs. First, optical access networks are the best solution for adapting to future developments, especially PONs and x-PONs that are combined with asynchronous transfer mode (ATM), Ethernet, or wavelength division multiplexing (WDM), which have proved to be a cost effective way to integrate broadband access networks. Second, by using PON technology, the entire optical distribution network is passive, small, and simple. Third, compared to cable networks, PONs can reduce the maintenance costs and avoid electromagnetic interference problems. Fourth, the PON's passive optical network unit (ONU) does not need power, so the ONU not only avoids numerous power supply problems, but also is more reliable than powered devices. Fifth, the overall network cost is lower because the passive devices share the optical fiber. Sixth, PONs support new services, especially multimedia and broadband services, and therefore PONs can strengthen the operator's core competitiveness, quicken the development of new services, benefit from new investments in optical network construction, and promote digital access networks. Seventh, to a certain degree, PONs are transparent to the transmission system and easy to upgrade.

Depending on the content that the PON carries, PON technology can be classified as ATM-based PON (APON), Ethernet-based PON (EPON), or Gigabit PON (GPON). Using APON, EPON, or GPON technology, the PON can support speeds of 155 Mbps, 622 Mbps, 1.25 Gigabits per second (Gbps), or 2.5 Gbps on the PON core fiber. By supporting multiple transmission speeds, the bandwidth assignment for each subscriber may be either static or dynamic.

According to the fiber extension, the optical access network can be classified as Fiber to the Home (FTTH), Fiber to the Building (FTTB), Fiber to the Curb (FTTCurb), Fiber to the Cabinet (FTTC), or Fiber to the Premises (FTTP), which can be referred to generically as Fiber to the X (FTTX).

One embodiment of the PON structure is shown in FIG. 1, and includes an Optical Line Terminal (OLT) located at the central office and a plurality of ONUs or optical network terminals (ONTs) located at the user locations. The primary difference between the ONU and the ONT is that the ONT is located at the customer side, while the ONU has other networks, such as an Ethernet network, between the ONU and the user. Because the differences between the ONU and the ONT are limited, the use of ONU herein refers to either the ONU or the ONT. The OLT and ONU are connected via fiber with an optical distribution network (ODN) containing passive splitters and/or couplers. In the PON, an optical fiber is laid from the service switch center to the broadband service sub-area, and then passive splitters and/or couplers separate the main fiber into several sub-channels that run to each building and service facility. The downstream direction refers to signals traveling from the OLT to the ONU, and the upstream direction refers to signals traveling from the ONU to the OLT.

FIG. 2 illustrates one embodiment of the OLT, which includes an optical module, a service processing module, a control module, and a power module. FIG. 3 illustrates one embodiment of the ONU, which includes an optical module, a service processing module, and a power module. The optical module converts optical signals received by the OLT and ONU, and includes an optical receiver and an optical transmitter. The power module is connected to the optical module in the OLT and the ONU, and provides power to the optical receiver and the optical transmitter. The power module may be controlled by a manual switch. In the OLT, the service processing module is connected to the central office (CO) upstream network interface through a central network interface (CNI). In the ONU, the service processing module is connected to the user devices through a user network interface (UNI).

Referring back to FIG. 1, in the PON the downstream data transmission process is different from the upstream data transmission process. The downstream data is broadcast from the OLT to every ONU, and each ONU uses the address information in the packet's protocol header to determine whether the destination address in the packet matches the ONU's address. Each ONU processes the packets that match its own address and ignores packets intended for other ONUs. Upstream transmission is more complex because the ODN's optical medium is shared. To avoid packet collision, the OLT control module uses time division multiple access (TDMA) to control the upstream data transmissions. Thus, specific upstream transmission timeslots are assigned to each ONU, and the timeslots are synchronized to prevent the packets from different ONUs from colliding.

In a point-to-multipoint PON, the upstream data is transmitted in TDMA mode, thus each ONU transmits time division multiplexed data to the OLT. The OLT assigns each ONU a timeslot to guarantee that only one ONU will emit light at any given time, thereby avoiding packet collisions. Under normal circumstances, the ONU's optical module is only active during the timeslot assigned by the OLT. However, a fault may occur in an optical module that causes the optical module to constantly emit light, perhaps because a malicious user set the optical module in a constant light-emitting state.

If such a fault occurs in an ONU, then all of the ONUs connected to the same OLT as the faulty ONU will be deactivated.

One existing solution that may solve constant light-emitting faults is the use of an active splitter that monitors each of the splitter's sub-channels. If one of the sub-channels constantly emits light, then the OLT can disable the affected sub-channel. However, using active splitters eliminates many of the advantages of the PON by reducing the reliability of the system, increasing the amount of maintenance, and increasing the cost of the system.

Thus, a need exists for improvement in the present technology. To meet the industry demands, the improvement needs to detect and isolate the faulty ONU and avoid affecting the other, normal ONUs.

SUMMARY

The embodiments of the present disclosure provide a PON maintenance method and system. When one or more ONUs constantly emit light because their burst function has been disabled, the system can detect and isolate the faulty ONU to keep the faulty ONU from affecting other, normal ONUs, thus enhancing the security, stability, and recoverability of the entire PON.

An embodiment of the present disclosure uses the following technology scheme: a PON maintenance method, the PON including an OLT and a plurality of ONUs where the downstream direction is from the OLT to the ONUs and the upstream direction is from the ONUs to the OLT, the method including:

A. the OLT parses the upstream signals from the ONUs;

B. if the OLT cannot parse the upstream signals from the ONUs, then there is an faulty ONU in the PON and the OLT raises an alarm and the PON enters a detection state; and C. the OLT detects the fault by recording the optical power of the upstream signal, locates the faulty ONU using the optical power, sends a downstream order to disable the power to the optical transmitter in the faulty ONU, and isolates the faulty ONU, then the PON exits the detection state and returns to the step A working state.

In an embodiment, step C comprises the following steps:

C1. The OLT sends a downstream order to the ONUs to stop sending upstream optical signals and then records the optical power, P1;

C2. If P1 is equal to zero, then the OLT orders each ONU to send the upstream optical signals sequentially, when the Nth ONU sends an upstream optical signal and the OLT cannot parse the upstream optical signal, then the Nth ONU is the faulty ONU and the OLT isolates the faulty ONU; and C3. If P1 is not equal to zero, then the OLT detects each ONU sequentially and locates the faulty ONU. The exact method is that the OLT selects an ONUx, orders ONUx to send an upstream signal, and records the optical power for ONUx, Px, using an optical power detector.

If Px is equal to P1, then the ONUx is the faulty ONU; and

If Px is greater than P1, then the ONUx is not the faulty ONU and the OLT orders the ONUx to stop emitting light. The remainder may be deduced by analogy: the OLT detects each ONU, determines the faulty ONUs, and then isolate the faulty ONUs.

The OLT includes an optical power detector, which is used for recording the optical power of the upstream signal.

In the step B, the situations in which the upstream signal cannot be parsed include an unrecognizable message, a bit error rate or frame error rate that exceeds the set value in the PON, or a signal-to-noise ratio (SNR) lower than the set value.

In the step C, the OLT sends an order that is used by a control message, an extended operations, administration, and maintenance (OAM) message, or is user-defined in an existing protocol, to disable the power to the ONU's optical transmitter.

Another embodiment of the present disclosure includes a system for maintenance of a PON including an OLT and an ONU, the OLT including a service processing module, a control module, an optical module, and an optical power detection module connected to the control module and the optical module, wherein the optical power detection module measures the total power of the optical signals received in the PON.

The optical module includes an optical receiver, an optical transmitter, and an optical coupler/decoupler connected to an optical power detector, which detects the change in optical power of light split by the optical coupler/decoupler.

The ONU includes a service processing module, an optical module that includes an optical transmitter, an optical receiver, an optical coupler/decoupler, and an optical transmitter power module that has a power switch to turn the optical transmitter in the ONU optical module on and off, the service processing module in the ONU receiving orders from the ONU to control the switch in the optical transmitter power module.

In an embodiment, the present disclosure is advantageous because the optical power detector is added to the OLT to record the total power of the received optical signals in the PON and the PON's faulty ONU can be determined using the received optical power. This method is simple and reliable. Furthermore, the ONU's optical module is equipped with an optical transmitter power switch that can be controlled by the PON protocol control chip. The optical transmitter power is separate from the optical receiver power, thus the OLT can remotely disable the optical transmitter power and disable the optical transmitter.

In the present disclosure, using the detection and isolation method with the OLT and the ONU, a fault detection system in the PON detects and disables a faulty ONU that constantly emits light so that the faulty ONU will not affect the other, normal ONUs. The fault detection system can maintain normal working of the PON system, thereby enhancing security, stability, and self-recoverability of the whole network.

DETAILED DESCRIPTION

Figure 1:
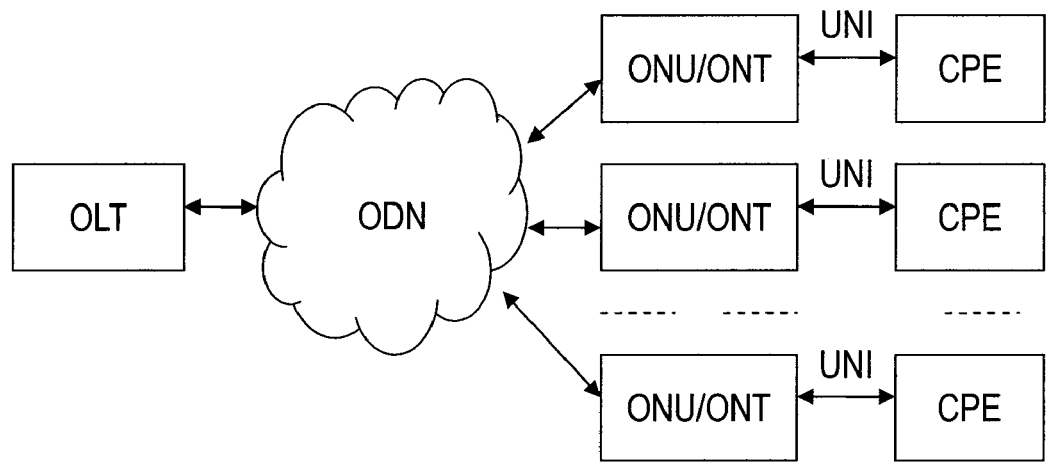
FIG. 1 is a schematic diagram of one embodiment of the PON structure.
Figure 2:
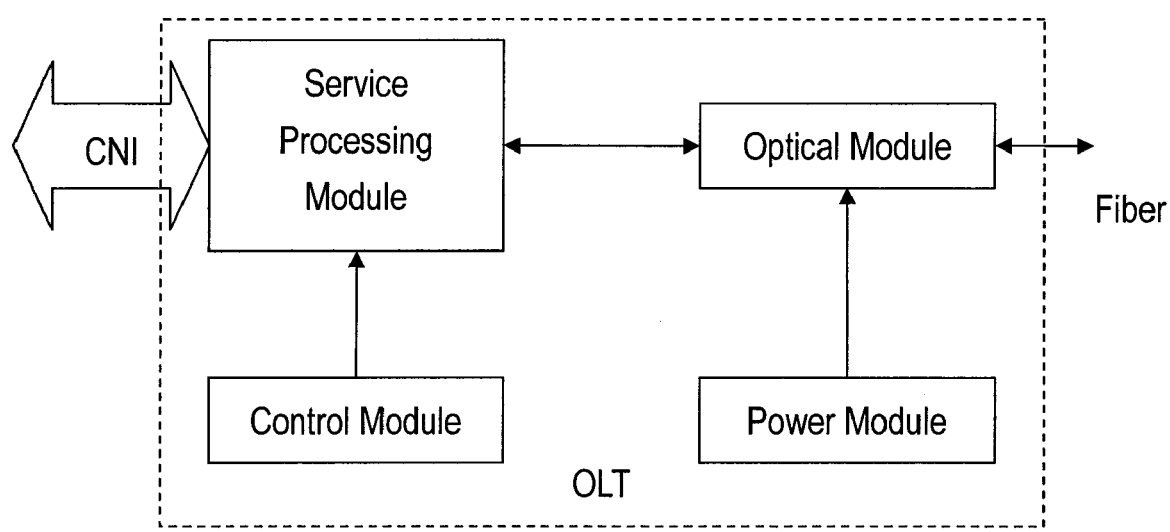
FIG. 2 is a schematic diagram of one embodiment of the OLT.
Figure 3:
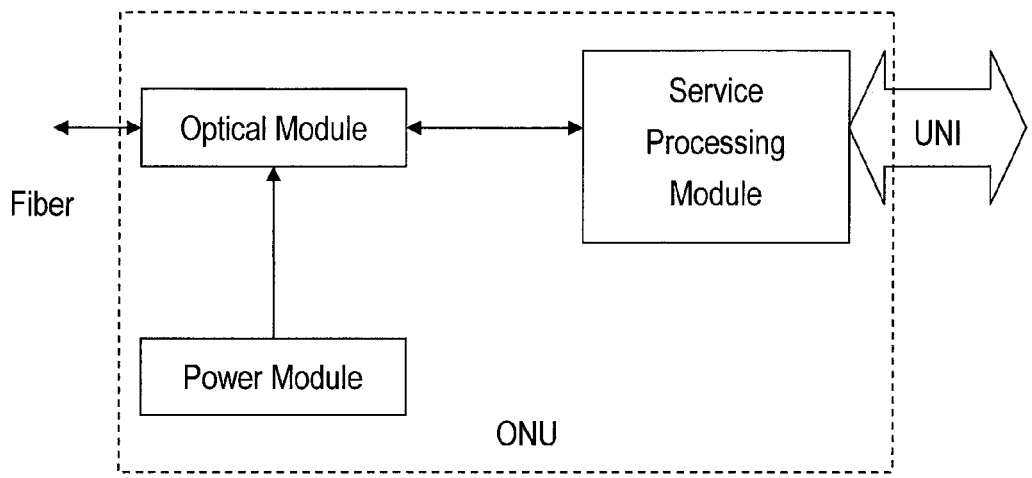
FIG. 3 is a schematic diagram of one embodiment of the ONU.

Referring to the drawings and the detailed description, the disclosure will be further described.

Figure 4:
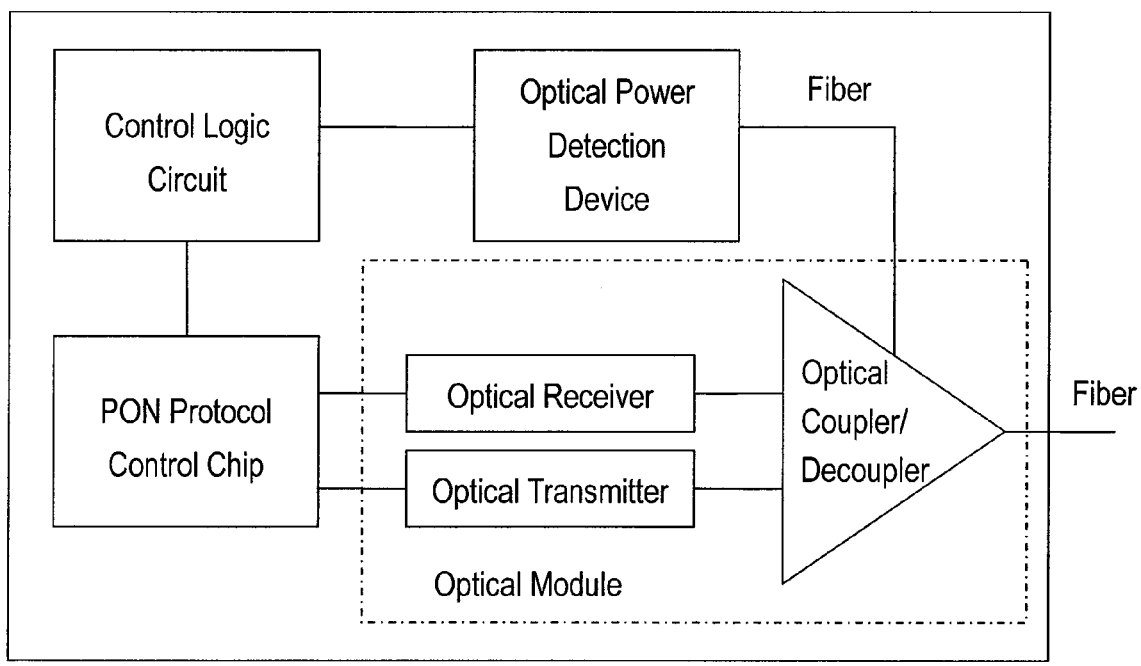
FIG. 4 is a schematic diagram of another embodiment of the OLT.

FIG. 4 is a schematic diagram of an embodiment of the OLT. The OLT includes an optical module, a service processing module (PON protocol control chip), a control module (control logic circuit), and an optical power detector. The optical module includes an optical receiver that is connected to the upstream portion, receives upstream signals, and implements the optical-electrical conversions. The optical module also includes an optical transmitter that is connected to the downstream portion and sends the electrical signals after the electrical-optical conversion. The optical module also includes an optical coupler/decoupler connected to the optical power detector that detects a change in optical power of the light split by the optical coupler/decoupler.

Figure 5:
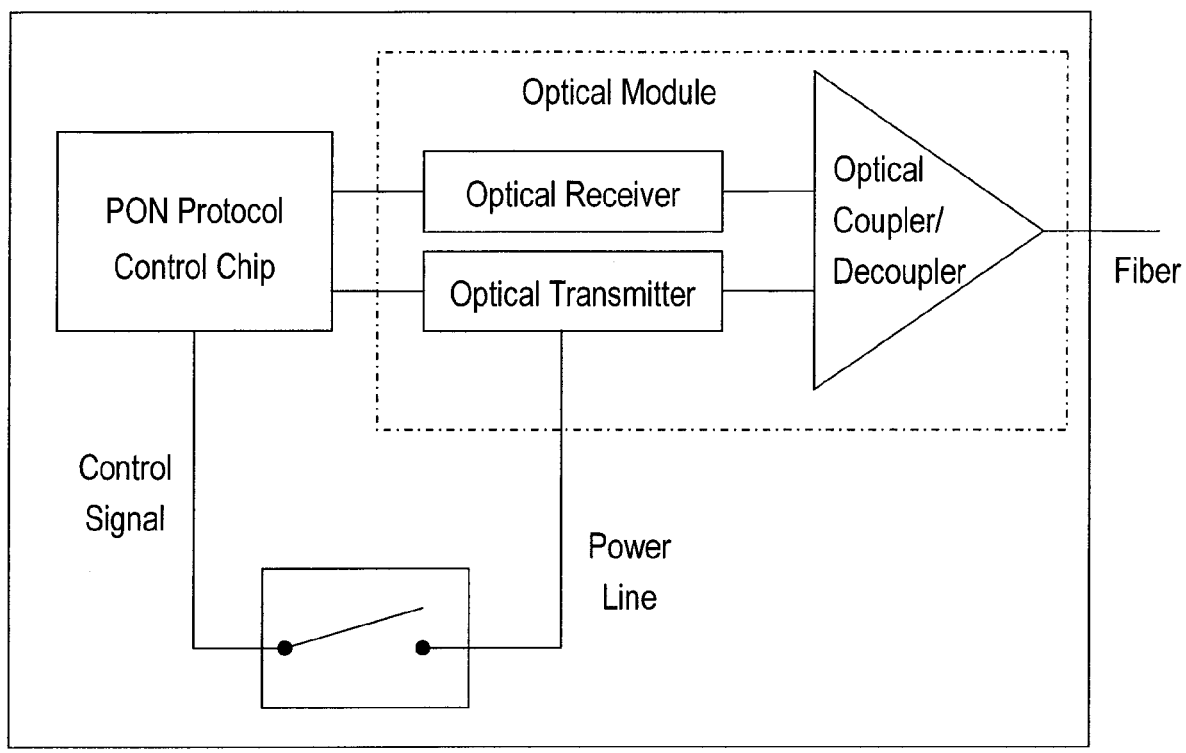
FIG. 5 is a schematic diagram of another embodiment of the ONU.

FIG. 5 is a schematic diagram of an embodiment of the ONU. The ONU includes an optical module, a service processing module (PON protocol control chip), and an optical transmitter power module. The optical module includes an optical receiver, an optical transmitter, and an optical coupler/decoupler.

The main function of the ONU is to perform the optical-electrical conversion: convert the electrical signal from customer premises equipment (CPE) into an optical signal, and convert the received optical signal into an electrical signal that can be recognized by the CPE. It is noteworthy that the optical receiver and the optical transmitter in conventional ONUs share a single power supply, the switch for which is controlled manually. In contrast, in an embodiment of the present disclosure, the optical receiver power is separate from the optical transmitter power, and the switch for the optical transmitter power can be controlled by the PON protocol control chip. As such, the OLT can send an order to disable the power for the ONU's optical transmitter so that the ONU's optical transmitter will stop working. For example, if a fault occurs in which one or more ONUs constantly emit light, the OLT can send an order to disable the optical module of one or all of the ONUs. In response to the order, the faulty ONU's PON protocol control chip controls the optical transmitter power switch using an extension of a control message, an OAM message, or is carried in a message defined by a user based on an existing protocol. The actual implementation and procedures are familiar to those skilled in the art and need not be provided here.

By using the OLT and the ONU together, a fault detection system is established in the PON, which detects and isolates the faulty ONU that constantly emits light.

Figure 6:
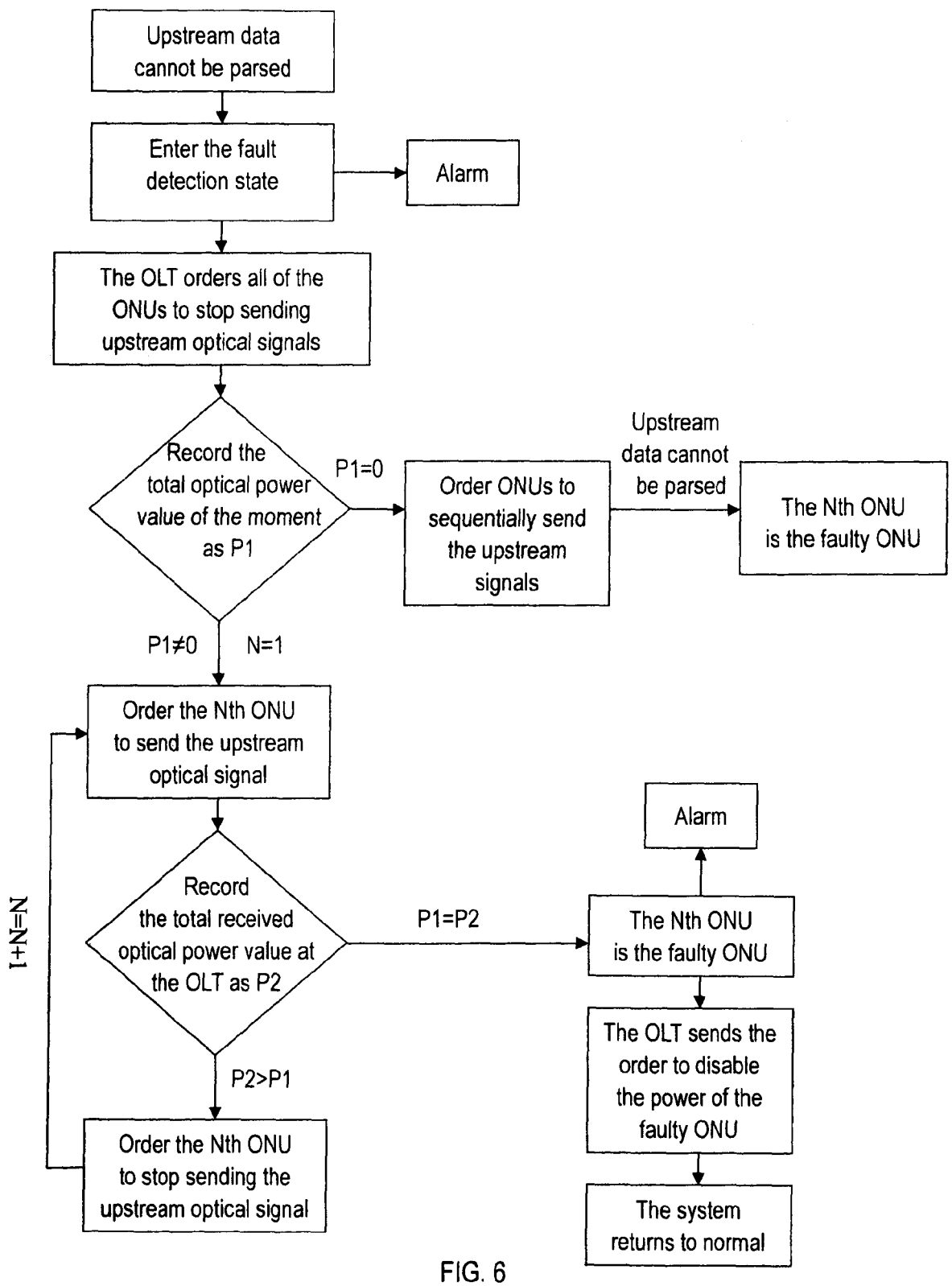
FIG. 6 is a flowchart of one embodiment of the process for maintaining the PON.

FIG. 6 is a schematic logic diagram of the process for detecting and isolating the faulty unit that is constantly emitting light. When a fault takes place in an ONU such that the ONU continually sends an upstream optical signal, the fault seriously interferes with the upstream optical signals from other ONUs, resulting in entire upstream signals that cannot be parsed. Examples of the interference include a bit error rate or frame error rate that is higher than the set value within the PON so that the message cannot be recognized, and a SNR that is lower than the set value within the PON, the settings of which depend primarily on the resilience of the PON. When the signal cannot be parsed, the OLT does not receive upstream signals for some period of time, and it can be determined that a fault has occurred in the ONU. At that point, the OLT raises an alarm and enters a fault detection state, so as to confirm where the fault has occurred.

First, the OLT sends an order to deactivate all of the ONUs. In response, all of the ONUs will stop sending upstream signals, but the faulty ONU will continue to emit light because a fault has occurred in its optical transmitter. The optical power detection device in the OLT records the optical power value as $P1$ at that moment. The downstream direction continues to operate normally. There are two instances when the ONU constantly emits light:

When $P1=0$, the faulty ONU can be deactivated, and the possessing in such a situation is simple. The OLT orders each of the ONUs to send their upstream signals sequentially: one at a time, in series. When the Nth ONU sends an upstream signal and the system cannot parse the upstream signal or a breakdown of the whole system occurs, then it can be determined that the Nth ONU is a faulty ONU. The OLT then sends an order to switch off the Nth ONU's power, which completely stops the Nth ONU from sending upstream optical signals and isolates the Nth ONU.

When $P1$ does not equal 0, the faulty ONU cannot be deactivated, so the following procedure is used:

The OLT orders each of the ONUs to send their upstream signals sequentially and disables each ONU after detecting the optical power value;

If the Xth ONU is a normal ONU, then the detected optical power value is $P1+T>P1$, where T is the optical power value of the upstream optical signal from the Xth ONU;

If the Xth ONU is the faulty ONU, then only the Xth ONU is sending the upstream optical signal at that moment, so the detected optical power value is still $P1$, and it can be determined that the Xth ONU is the faulty ONU.

After confirming that the Xth ONU is the faulty ONU, the OLT sends an order to switch off the power of the Xth ONU, so as to completely stop the Xth ONU from sending upstream optical signals, thereby isolating the Xth ONU.

After isolating all of the faulty ONUs, the PON resumes upstream communications, and returns to normal.

As discussed above, the method in the present disclosure can be generalized by two processes: the process of detecting a system fault point and the process of system recovery. Such an embodiment is as follows:

(1) The process of detecting the system fault point:

the OLT enter a fault processing state, disables the upstream data transmission for all of the ONUs (but does not disable their power), and then detects the received optical power;

record the detected optical power value;

select one ONU to send data (the other ONUs still do not send data), the OLT detecting the received optical power, and recording the received optical power. If the detected value is higher than the value when all ONU are ordered to be disabled, then the ONU is normal, otherwise, the ONU is the fault point;

the procedure repeats to detect all of ONUs and determine all of the faulty ONUs.

(2) Process of system recovery:

The OLT sends an order to disable the optical transmitter power of the faulty ONU, and then the system exits the detection state and enters into a work state. At that time, all of the ONUs, except the faulty ONU, work normally.

While the present disclosure has been described with reference to specific embodiments, this description is illustrative of the disclosure and should not be construed as limiting the disclosure. Various modifications to the present disclosure can be made to the preferred embodiments by those skilled in the art without departing from the true spirit and scope of the disclosure as defined by the appended claims. Accordingly, the scope of the present disclosure is defined by the appended claims rather than the forgoing description of embodiments.

What is claimed is:

1. A passive optical network (PON) component comprising a processor configured to implement a method comprising:

parsing a plurality of signals from a plurality of optical network units (ONUs);

determining that one of the ONUs is a faulty ONU when the parsing is unsuccessful;

responsive to determining that one of the ONUs is faulty, analyzing an optical power of the signals to detect the faulty ONU; and sending an order to disable an optical transmitter in the faulty ONU, wherein analyzing the optical power of the signals comprises:

ordering the ONUs to stop sending signals, and recording a first optical power value, wherein when the first optical power value is not equal to zero, analyzing the optical power of the signals further comprises individually checking each ONU to determine the faulty ONU, and wherein individually checking each ONU comprises:

selecting one of the ONUs, ordering the selected ONU to send a signal, and recording a second optical power value;

determining that the selected ONU is the faulty ONU when the second optical power value is equal to the first optical power value; and determining that the selected ONU is not the faulty ONU and instructing the selected ONU to stop transmitting the signal when the second optical power value is not equal to the first optical power value.

2. The component of claim 1 wherein analyzing the optical power of the signals comprises:

ordering the ONUs to stop sending the signals, and recording a first optical power value, wherein when the first optical power value is equal to zero, analyzing the optical power of the signals further comprises:

ordering the ONUs to sequentially send the signals; and determining that one of the ONUs is the faulty ONU when the signal sent from one of the ONUs is unable to be parsed.

3. The component of claim 1 wherein the parsing is unsuccessful when a message is unrecognizable, a bit error rate is more than a first preset value, a block error rate is more than a second preset value, or a signal-to-noise ratio is less than a third preset value.

4. The component of claim 1 wherein the order to disable the optical transmitter in the faulty ONU is an extension of a control message, is an extension of an operation, administration, and maintenance message, or is carried in a message defined by a user based on an existing protocol.

5. The component of claim 1 further comprising an optical power detection module configured to measure the power of the signals.

6. The component of claim 1 wherein the faulty ONU comprises:

an optical module comprising the optical transmitter and an optical receiver; and a switch in communication with the optical module and configured to control the optical transmitter independent of the optical receiver.

7. An optical line terminal comprising the component of claim 1.

* * * * *